United States Patent
Schreter

(10) Patent No.: US 11,163,609 B2
(45) Date of Patent: Nov. 2, 2021

(54) HIGH-PERFORMANCE MEMORY ALLOCATOR

(71) Applicant: SAP SE, Walldorf (DE)

(72) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 1 day.

(21) Appl. No.: 16/373,278

(22) Filed: Apr. 2, 2019

(65) Prior Publication Data

US 2020/0319928 A1 Oct. 8, 2020

(51) Int. Cl.
G06F 9/46 (2006.01)
G06F 9/50 (2006.01)
G06F 3/06 (2006.01)

(52) U.S. Cl.
CPC .......... G06F 9/5016 (2013.01); G06F 3/0604 (2013.01); G06F 3/064 (2013.01); G06F 3/0631 (2013.01); G06F 3/0647 (2013.01); G06F 3/0673 (2013.01)

(58) Field of Classification Search
CPC .................................................. G06F 9/5016
USPC ........................................................ 718/104
See application file for complete search history.

(56) References Cited

U.S. PATENT DOCUMENTS

| 5,898,883 A * | 4/1999 | Fujii .................. G06F 12/0284 712/28 |
| 6,539,464 B1 * | 3/2003 | Getov ................... G06F 9/5016 711/147 |
| 7,733,888 B2 * | 6/2010 | Mathews .............. H04L 49/901 370/412 |
| 9,063,668 B1 * | 6/2015 | Jung ..................... G06F 9/5016 |
| 2012/0159502 A1 * | 6/2012 | Levin ................... G06F 9/5016 718/104 |
| 2016/0328175 A1 * | 11/2016 | Zhang .................. G06F 3/0659 |

* cited by examiner

Primary Examiner — Evral E Bodden
(74) Attorney, Agent, or Firm — Mintz Levin Cohn Ferris Glovsky and Popeo, P.C.

(57) ABSTRACT

A system and method of allocating memory to a thread of a multi-threaded program are disclosed. A method includes determining one or more thread-local blocks of memory that are available for the thread, and generating a count of the available one or more thread-local blocks for a thread-local freelist. If a thread-local block is available, allocating one block of the one or more thread-local blocks to the thread and decrementing the count in the thread-local freelist. When the count is zero, accessing a global freelist of available blocks of memory to determine a set of available blocks represented by the global freelist. Then, the set of available blocks are allocated from the global freelist to the thread-local freelist by copying one or more free block pointers of the global freelist to a thread-local state of the thread. Blocks can also be deallocated.

16 Claims, 3 Drawing Sheets

HIGH-PERFORMANCE MEMORY ALLOCATOR

TECHNICAL FIELD

The subject matter described herein relates to memory management, and more particularly to a high-performance memory allocator for managing highly-volatile allocations and deallocations of memory in an optimal way.

BACKGROUND

Memory management is an important aspect of most software programs, and in particular with large database platforms on which multi-threaded applications perform large numbers of data access operations. Memory management performance typically directly influences a performance of an associated software program. Thus, in some cases for special purposes, memory allocators are specifically introduced to handle a next usage of memory. A memory allocator can be a building block of more complex allocators.

One example is a "freelist" memory allocator, which allocates memory blocks of a fixed size, and upon deallocation, keeps them in the freelist for later reuse on following allocations. A freelist is a data structure that allows better memory load, and a freelist memory allocator operates by connecting unallocated regions of memory together for example in a single linked list, using the first word of each unallocated region as a pointer to the next. It is typically most suitable for allocating memory from a memory pool, where all objects have the same size.

Another challenge is how to handle memory allocation needs in a heavily multi-threaded program. While each thread can manage its own memory, this is suboptimal since it might lead to imbalances in memory allocation. For instance, in a producer-consumer relationship, this would ultimately move all the available memory to the consumer and then the system cannot make further progress. Using global memory pools (e.g., a set of synchronized freelists) is usually not feasible due to heavy contention and thus poor performance.

SUMMARY

In this disclosure, a system and method are described for managing highly-volatile memory allocations in an optimal way, using a single fixed-size freelist. In accordance with this system and method, a communication with a global state is only done at most for every N/2-th allocation, greatly reducing pressure on the global state. Further, for use cases where small objects are allocated and/or deallocated repeatedly, the freelist on the thread buffers repeated allocations/deallocations. Thus, the pressure on the global state is reduced even more, ideally close to zero, so the program can be (almost) linearly scaled over available threads (CPU cores). Accordingly, a system and method consistent with this disclosure provides for a local array of pointers, in addition to a global linked list of arrays of pointers.

In some aspects, a method, system and computer program product are provided to execute a process that includes the steps determining one or more thread-local blocks of memory that are available for the thread, generating a count of the available one or more thread-local blocks for a thread-local freelist. If a thread-local block is available, the process includes allocating one block of the one or more thread-local blocks to the thread and decrementing the count in the thread-local freelist. When the count is zero, the process includes accessing a global freelist of available blocks of memory to determine a set of available blocks represented by the global freelist. The process includes allocating the set of available blocks from the global freelist to the thread-local freelist by copying one or more free block pointers of the global freelist to a thread-local state of the thread. The process further includes transferring the one or more blocks associated with the one or more free block pointers by the thread from the global freelist to the thread-local freelist.

In other aspects, a system and method includes deallocating one or more memory blocks. A memory block is deallocated by providing it to the thread-local freelist, unless it is full. If the thread-local freelist is full, a set of pointers of size N/2 to free blocks is moved to the global freelist for reuse by other threads.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

In accordance with implementations described herein, a system and method for managing highly-volatile memory allocations in an optimal way are presented. The system and method use a single global freelist. In accordance with this system and method, a communication with a global state is only done at most for every N/2-th allocation of memory, greatly reducing pressure on the global state. Further, for use cases where small objects are allocated and/or deallocated repeatedly, the freelist on the thread buffers repeated allocations/deallocations. Thus, the pressure on the global state is reduced even more, ideally close to zero, so the program can be linearly or nearly linearly scaled over available threads (CPU cores).

Figure 1:
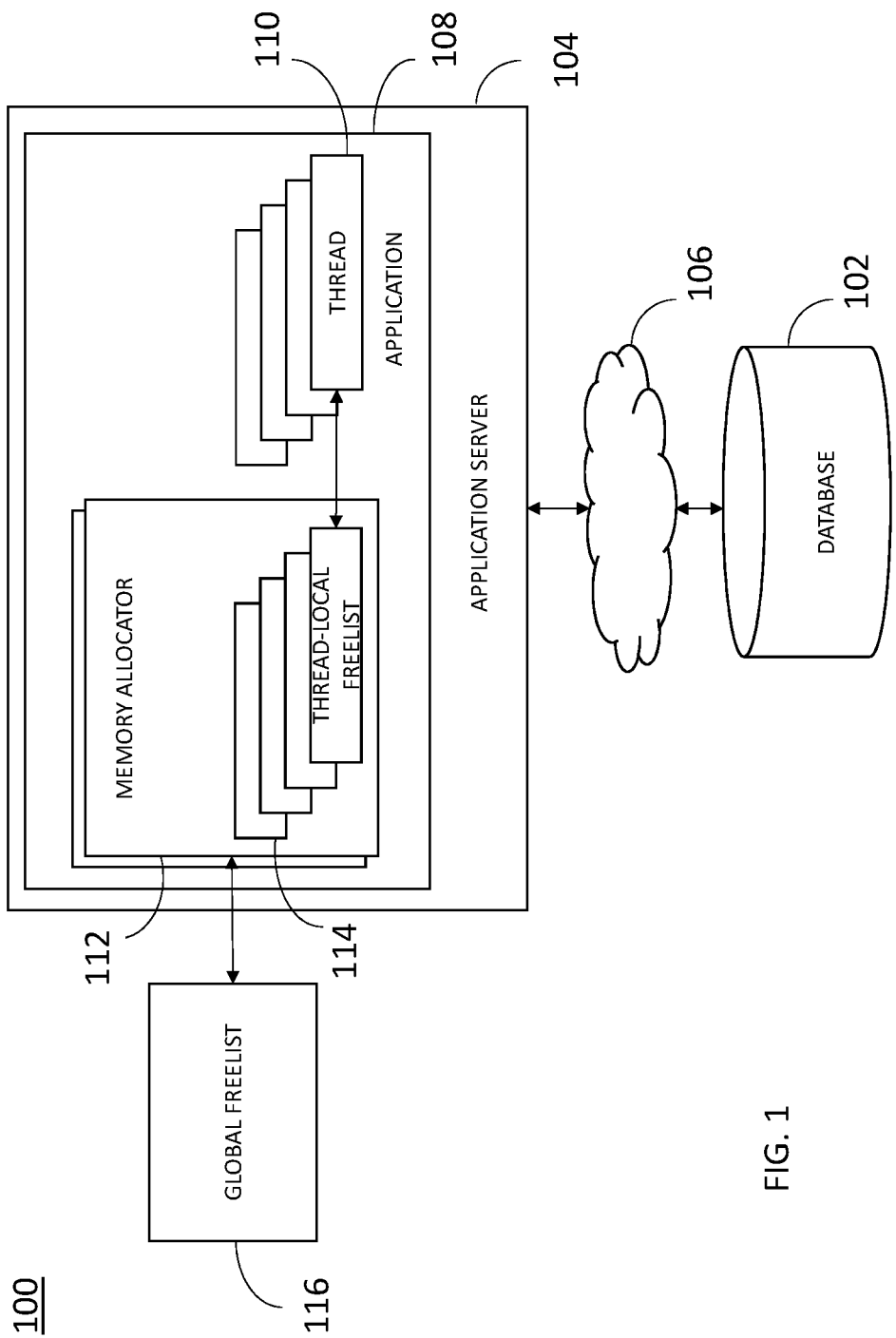
FIG. 1 shows a diagram illustrating aspects of a system showing features consistent with implementations of the current subject matter.

FIG. 1 depicts a computing system 100 that can implement the presently disclosed system and method. The computing system 100 includes a database 102 or other memory structure. The database 102 can be part of an in-memory, column-oriented, relational database management system (DBS) developed and marketed by SAP SE, for example. The database 102 can store and retrieve data as requested by applications that are allowed access to the database 102. In addition, the database 102, as part of a DBS, can perform advanced analytics (predictive analytics, spatial data processing, text analytics, text search, streaming analytics, graph data processing) and includes extract, transform, load (ETL) capabilities.

The system 100 can further include an application server 104, which can communicate with the database 102 directly or via a communication network 106. The communication network 106 can include any number of networks and computing nodes, and can also be referred to herein as the "cloud." The application server 104 executes an application 108 using data stored in the database 102. The application 108 can have one or more executable threads 110, where each thread executes and/or processes a portion of the application 108.

The application 108 of the application server 104 of the system 100 can further include a high-performance memory allocator 112, which includes one or more thread-local freelists 114 for allocating memory blocks to a corresponding one or more threads 110 based on a thread's need for memory. The memory allocator 112 further includes a global freelist 116. The memory allocator 112, thread-local freelist 114, and global freelist 116, and their operation, are described in further detail below.

In accordance with some implementations, each execution thread in the system allocates a fixed size array, with pointers to free blocks of memory in the thread. For example, for N slots in an array, N will be chosen in such a way that the product of N/2, block size, and maximum number of threads does not exceed a desired overhead. In a specific example, for a maximum of 512 threads, 256B sized blocks and typical overhead of 4 MB, the system can allocate N=64.

Accordingly, the above parameters can result in the following data structure for an allocation state of the thread:

```
struct allocation_state
{
  void* block[N];
  int count;
};
thread_local allocation_state state;
```

This thread-local structure maintains just the local freelist of a bounded size (N). Further, a global atomic freelist is needed to communicate between threads. This global freelist keeps blocks of free blocks, which can be represented as follows:

```
struct free_block
{
  void* block[N/2];
  int count;
  free_block* next;
};
lifo global_state;
```

For simplicity, the free_block can be implemented as a simple array. In other implementations, the size of the free_block as depicted above might exceed the size of one block in the freelist. In that case, the free_block structure must be split over several free blocks of memory. Additionally, the individual blocks are provided by an underlying global allocator, which also provides an interface to allocate memory. In the simplest case, the global allocator can allocate memory from the operating system using a mmap( ) call or the like. For example, in some instances, the interface may look like:

```
struct allocator
{
  void* allocate(size_t size);
}
allocator global_allocator;
```

Thread Startup

Upon thread startup, the thread's state is initialized to "empty," e.g.:

```
void thread_start( )
{
  state.count = 0;
}
```

Memory Allocation

When allocating memory, first the thread-local freelist is consulted. If empty, global freelist is consulted to refill the local freelist with up to N/2 entries.

The algorithm would then look like this:

```
void* allocate( )
{
  if (state.count > 0)
```

```
    // there are thread-local blocks available, decrement count and return one block
    return state.block[--state.count];
    // no local blocks available, try to get set of blocks from the global freelist
    auto new_block = global_state.pop( );
    if (new_block != nullptr) {
        // there was a new block available, copy free block pointers to thread-local state
        state.count = new_block.count;
        for (int i = 0; i < new_block->size; ++i)
            state.block[i] = new_block[i];
    } else {
        // there are no blocks available in the global freelist, refill from underlying allocator
        for (int i =0; i < N/2; ++i) {
            state.blocks[i] = global_allocator.allocate(size);
            state.count = i;
        }
    }
    // thread-local state now has some blocks, return one of them
    return allocate( );
}
```

Of course, in preferred implementations, the algorithm can allocate all new blocks upon refill using a single call to the underlying allocator and then split the allocated large memory block to individual blocks of given size.

Memory Deallocation

To deallocate memory block, it is simply put to the thread-local freelist, unless it is full. If the thread-local freelist is full, a set of pointers of size N/2 to free blocks is moved to the global state for reuse by other threads.

The algorithm can look like the following:

```
void deallocate(void* p)
{
    if (state.count == N) {
        // thread-local freelist is full, move N/2 to global state
        flush( );
    }
    state.block[state.count++] = p;
}
```

To move data to global state, we need a flush method that transfers (up to) N/2 blocks (see later) to the global state. When transferring blocks, we can use the first block being transferred as the block to store the list of free block pointers. The algorithm looks like this:

```
void flush( )
{
    int count = min(state.count, N/2);
    if (count) {
        int start = max(0, state.count - N/2);
        free_block* f = reinterpret_cast<free_block*>(state.blocks[start]);
        f->count = count;
        for (int i = 0; i < count; ++i)
            f->blocks[i] = state.blocks[start + i];
        state.count = start;
        global_state.push(f);
    }
}
```

Again, the array of blocks inside the newly-constructed free_block might be too large, so it can be split over multiple blocks. This may be needed for small block sizes.

Thread Termination

When a thread terminates, it still may own some of the blocks in its local freelist. These blocks need to be moved to the global freelist, so that no memory leaks happen. Since up to N entries may be in the local freelist, the flush needs to be called twice, e.g.:

```
void thread_finish( )
{
    flush( );
    flush( );
}
```

Using the methods described herein, a communication with global state is only done at most for every N/2-th allocation (worst case), greatly reducing pressure on the global state. Further, for use cases where small objects are allocated/deallocated repeatedly, the freelist on the thread buffers repeated allocations/deallocations. Thus, the pressure on the global state is reduced even more, ideally close to zero, so the program can be (almost) linearly scaled over available threads (CPU cores).

Figure 2:
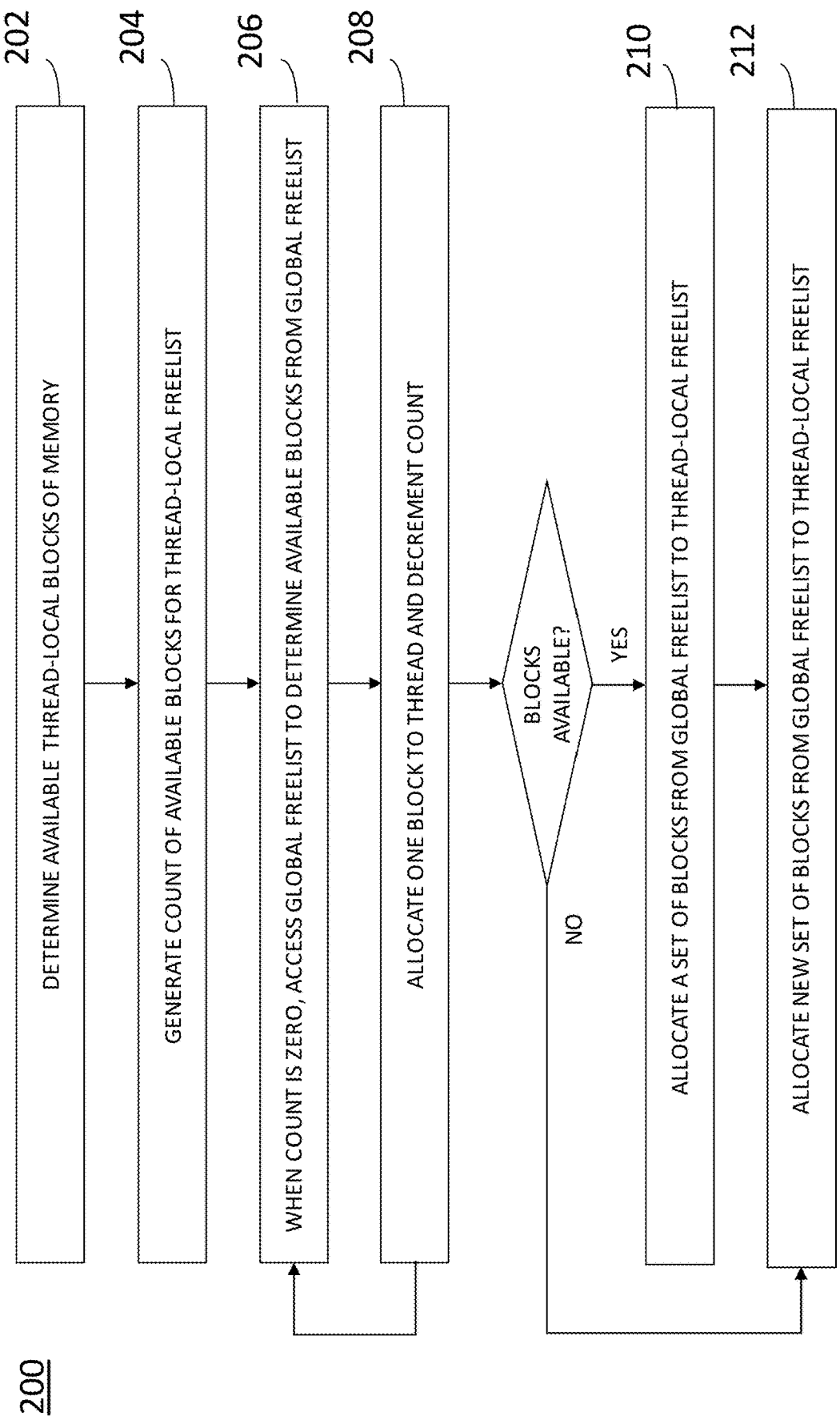
FIG. 2 shows a process flow diagram illustrating aspects of a method having one or more features consistent with implementations of the current subject matter.

FIG. 2 is a flowchart of a method 200 of allocating memory to a thread of a multi-threaded program, in accordance with implementations described herein. At 202, a computing system determines one or more thread-local blocks of memory that are available for the thread. At 204, a count of the available one or more thread-local blocks for a thread-local freelist is generated. When the count is zero, at 206, a global freelist of available blocks of memory is accessed to determine a set of available blocks represented by the global freelist, and the set of blocks allocated from the global freelist can be accessed. If a thread-local block is available, at 208, one block of the one or more thread-local blocks is allocated to the thread, and the count in the thread-local freelist is decremented. If there are blocks available, at 210, the set of available blocks from the global freelist is allocated to the thread-local freelist by copying one or more free block pointers of the global freelist to a thread-local state of the thread. If there are no blocks available in the global freelist, then at 212, a new set of blocks are allocated from the global freelist to the thread-local freelist.

Figure 3:
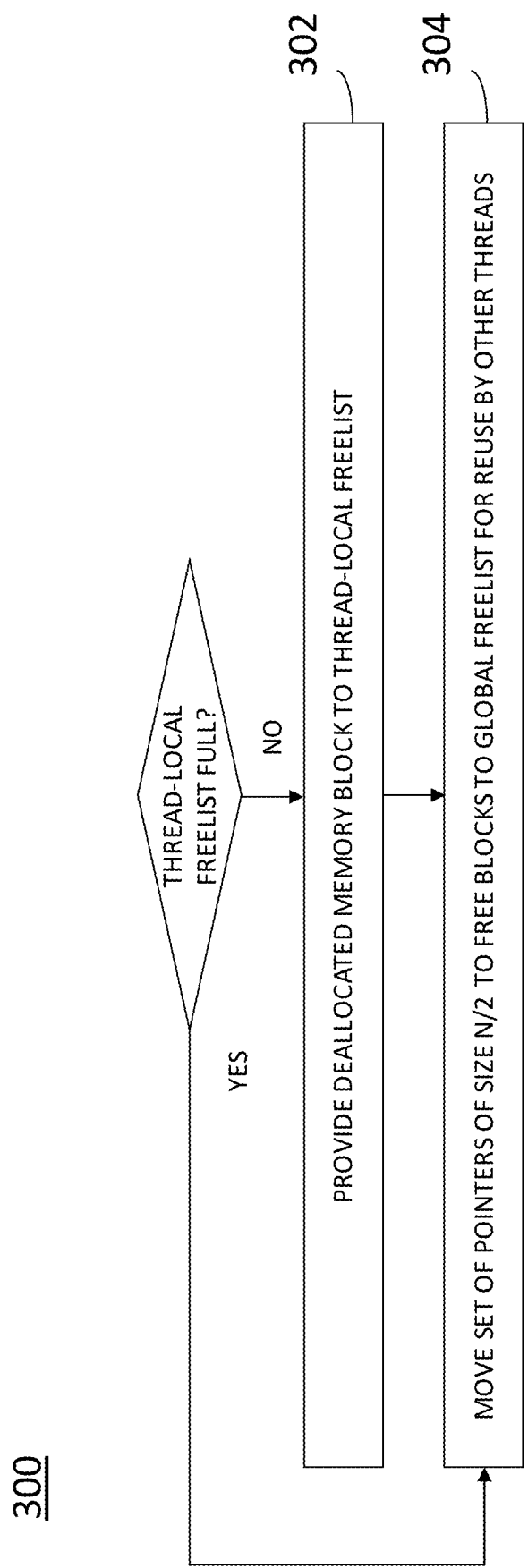
FIG. 3 shows a process flow diagram illustrating aspects of a method for deallocating memory from a thread of a multi-threaded program.

FIG. 3 is a flowchart of a method 300 for deallocating memory from a thread of a multi-threaded program. It is first determined whether the thread-local freelist is full. If the thread-local freelist is not full, at 302, one or more deallocated memory blocks are provided to the thread-local freelist. If the thread-local freelist is full, at 304, a set of pointers to free blocks, of size N/2, is move to the global freelist for reuse by other threads of the multi-threaded application.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method of allocating memory to a thread of a multi-threaded program, the method comprising:
    determining one or more thread-local blocks of memory that are available for the thread;
    generating a count of the available one or more thread-local blocks for a thread-local freelist, wherein the thread-local freelist comprises a first data structure pointing to unallocated blocks of memory for use locally by the thread;
    if a thread-local block is available, allocating one block of the one or more thread-local blocks to the thread and decrementing the count in the thread-local freelist;
    when the count is zero, accessing a global freelist of available blocks of memory to determine a set of available blocks represented by the global freelist, wherein the global freelist includes a second data structure pointing to unallocated blocks of memory accessible by a plurality of thread-local freelists; and
    in response to the accessing the global freelist, allocating the set of available blocks from the global freelist to the thread-local freelist by copying one or more free block pointers of the global freelist to a thread-local state of the thread, wherein the allocating the set of available blocks from the global freelist to the thread-local freelist refills the thread-local freelist as a block of N/2 entries of available blocks, wherein N represents a size of the first data structure.

2. The method in accordance with claim 1, further comprising transferring the one or more blocks associated with the one or more free block pointers by the thread from the global freelist to the thread-local freelist.

3. The method in accordance with claim 1, further comprising incrementing the count according to the available blocks represented by the global freelist.

4. The method in accordance with claim 1, further comprising using the first block being transferred as a transfer block to store the list of free block pointers.

5. The method in accordance with claim 1, further comprising:
if the thread-local freelist is not full, deallocating one or more memory blocks by providing the one or more memory blocks to the thread-local freelist; and
if the thread-local freelist is full, moving a set of pointers to free blocks to the global freelist for reuse by other threads, the set of pointers having a size N/2.

6. A system for allocating memory to a thread of a multi-threaded program, the system comprising:
a programmable processor; and
a machine-readable medium storing instructions that, in response to execution by the processor, cause the at least one programmable processor to perform operations comprising:
determine one or more thread-local blocks of memory that are available for the thread;
generate a count of the available one or more thread-local blocks for a thread-local freelist, wherein the thread-local freelist comprises a first data structure pointing to unallocated blocks of memory for use locally by the thread;
if a thread-local block is available, allocate one block of the one or more thread-local blocks to the thread and decrementing the count in the thread-local freelist;
when the count is zero, access a global freelist of available blocks of memory to determine a set of available blocks represented by the global freelist, wherein the global freelist includes a second data structure pointing to unallocated blocks of memory accessible by a plurality of thread-local freelists; and
in response to the access the global freelist, allocate the set of available blocks from the global freelist to the thread-local freelist by copying one or more free block pointers of the global freelist to a thread-local state of the thread, wherein the allocating the set of available blocks from the global freelist to the thread-local freelist refills the thread-local freelist as a block of N/2 entries of available blocks, wherein N represents a size of the first data structure.

7. The system in accordance with claim 6, wherein the operations further comprise an operation to transfer the one or more blocks associated with the one or more free block pointers by the thread from the global freelist to the thread-local freelist.

8. The system in accordance with claim 6, wherein the operations further comprise an operation to increment the count according to the available blocks represented by the global freelist.

9. The system in accordance with claim 6, wherein the operations further comprise an operation to use the first block being transferred as a transfer block to store the list of free block pointers.

10. The system in accordance with claim 6 wherein the operations further comprise operations to:
if the thread-local freelist is not full, deallocate one or more memory blocks by providing the one or more memory blocks to the thread-local freelist; and
if the thread-local freelist is full, move a set of pointers to free blocks to the global freelist for reuse by other threads, the set of pointers having a size N/2.

11. A computer program product comprising a non-transitory machine-readable medium storing instructions that, in response to execution by at least one programmable processor, cause the at least one programmable processor to perform operations comprising:
determine one or more thread-local blocks of memory that are available for the thread;
generate a count of the available one or more thread-local blocks for a thread-local freelist, wherein the thread local freelist comprises a first data structure pointing to unallocated blocks of memory for use locally by the thread;
if a thread-local block is available, allocate one block of the one or more thread-local blocks to the thread and decrementing the count in the thread-local freelist;
when the count is zero, access a global freelist of available blocks of memory to determine a set of available blocks represented by the global freelist, wherein the global freelist includes a second data structure pointing to unallocated blocks of memory accessible by a plurality of thread-local freelists; and
in response to the access the global freelist, allocate the set of available blocks from the global freelist to the thread-local freelist by copying one or more free block pointers of the global freelist to a thread-local state of the thread, wherein the allocating the set of available blocks from the global freelist to the thread-local freelist refills the thread-local freelist as a block of N/2 entries of available blocks, wherein N represents a size of the first data structure.

12. The computer program product in accordance with claim 11, wherein the operations further comprise an operation to transfer the one or more blocks associated with the one or more free block pointers by the thread from the global freelist to the thread-local freelist.

13. The computer program product in accordance with claim 11, wherein the operations further comprise an operation to increment the count according to the available blocks represented by the global freelist.

14. The computer program product in accordance with claim 11, wherein the operations further comprise an operation to use the first block being transferred as a transfer block to store the list of free block pointers.

15. The computer program product in accordance with claim 11 wherein the operations further comprise operations to:
if the thread-local freelist is not full, deallocate one or more memory blocks by providing the one or more memory blocks to the thread-local freelist; and
if the thread-local freelist is full, move a set of pointers to free blocks to the global freelist for reuse by other threads, the set of pointers having a size N/2.

16. The method of claim 1, further comprises in response to the global freelist not having the set of available blocks to allocate to the thread-local freelist, calling a global allocator to re-allocate memory for the thread-local state of the thread.

* * * * *